US005221330A

United States Patent [19]

Matsumoto et al.

[11] Patent Number: 5,221,330

[45] Date of Patent: Jun. 22, 1993

[54] CONCENTRATED DAMPENING WATER COMPOSITION FOR LITHOGRAPHIC PRINTING

[75] Inventors: Hiroshi Matsumoto; Kenji Kunichika, both of Shizuoka, Japan

[73] Assignee: Fuji Photo Film Co., Ltd., Minami-Ashigara, Japan

[21] Appl. No.: 889,391

[22] Filed: May 28, 1992

[30] Foreign Application Priority Data

| | | | |
|---|---|---|---|
| May 29, 1991 | [JP] | Japan | 3-126127 |
| Jun. 10, 1991 | [JP] | Japan | 3-138039 |
| Oct. 23, 1991 | [JP] | Japan | 3-275318 |
| Oct. 29, 1991 | [JP] | Japan | 3-283253 |

[51] Int. Cl.[5] ............ C09K 3/18

[52] U.S. Cl. ............ 106/2; 101/451

[58] Field of Search ............ 106/2; 101/451

[56] References Cited

U.S. PATENT DOCUMENTS

| | | | |
|---|---|---|---|
| 4,601,974 | 7/1986 | Kita et al. | 106/2 |
| 4,731,119 | 3/1988 | Toyama et al. | 106/2 |
| 4,734,132 | 3/1988 | Yoshida | 106/2 |
| 4,854,969 | 8/1989 | Bassemir et al. | 106/2 |
| 4,865,646 | 9/1989 | Egberg | 106/2 |
| 4,996,135 | 2/1991 | Toyama et al. | 106/2 |
| 5,064,749 | 11/1991 | Matsumoto et al. | 106/2 |
| 5,106,414 | 4/1992 | Kunichika et al. | 106/2 |

FOREIGN PATENT DOCUMENTS

| | | |
|---|---|---|
| 091601 | 10/1983 | European Pat. Off. . |
| 249751 | 12/1987 | European Pat. Off. . |
| 251621 | 1/1988 | European Pat. Off. . |
| 269760 | 6/1988 | European Pat. Off. . |
| 218190 | 9/1987 | Japan . |

OTHER PUBLICATIONS

WPIL Week 9117, 19 Mar. 1991, AN 91-122557 & JP-A-3 063 187 (Canon KK).

*Primary Examiner*—Helene Klemanski
*Attorney, Agent, or Firm*—Burns, Doane, Swecker & Mathis

[57] ABSTRACT

A concentrated dampening water composition for lithographic printing comprises a) 0.1 to 10% by weight of a hydrophilic polymeric compound having a film-forming ability; b) 0.01 to 15%, by weight of a pH buffering agent; c) 5 to 80% by weight of a water-miscible organic solvent having a boiling point of not less than 140° C. and whose 1% by weight aqueous solution has a surface tension of not more than 60 dynes/cm; d), 0.05 to 10% by weight of a compound, for instance, represented by the following general formula (III); and e) 30 to 80% by weight of water:

$$R^8—Z^1(R^9)(R^{10})—R^7.X^1 \quad (III)$$

wherein $R^7$ to $R^{10}$ each represents a $C_{1-12}$ alkyl, cyclic alkyl, hydroxyalkyl, benzyl or substituted or unsubstituted phenyl group; $Z^1$ represents N, P or B; $X^1$ represents an anion or cation selected from the group consisting of halogen, nitrate, sulfate, phosphate, hydroxyl, $PF_6^-$, $BF_4^-$, $Li^+$, $Na^+$, $K^+$ and $NH_4^+$. The composition shows good printing properties and does not impair image areas of printing plates although it comprises a high boiling point solvent. Further, it provides dampening water having excellent stability with time, satisfies the requirements stipulated in the Japanese Fire Services Act as well as Industrial Safety and Health Law and thus can steadily provide good copies.

16 Claims, No Drawings

CONCENTRATED DAMPENING WATER COMPOSITION FOR LITHOGRAPHIC PRINTING

BACKGROUND OF THE INVENTION

The present invention relates to a concentrated dampening water composition useful for offset printing using a lithographic printing plate.

Lithographic printing technique makes the best use of the properties of water and an oil such that they are essentially incompatible with one another. The printing surface of a lithographic printing plate comprises areas which receive water and repel an oil ink and those which repel water and receive an oil ink, the former serving as non-image areas and the latter serving as image areas. The non-image areas become damp with dampening water used in lithographic printing which contains a desensitizing agent to thus enhance the difference in surface chemical properties between the image areas and the non-image areas and hence to increase both the ink repellency of the non-image areas and the ink receptivity of the image areas.

As such dampening water, there have generally been known conventionally aqueous solutions containing such inorganic substances as alkali metal salts or ammonium salt of bichromic acid, phosphoric acid or salts thereof such as ammonium salt, and such a colloidal substance as gum arabic or carboxymethyl cellulose (CMC).

However, it is difficult to uniformly dampen the non-image areas of lithographic printing plates with the dampening water containing such a desensitizing agent and for this reason, the resultant printed matters are sometimes contaminated and a substantial skill in controlling the feed rate of the dampening water is required.

To overcome such disadvantages, there has been proposed the Dahlgren dampening system in which an aqueous solution containing about 20 to 25% of isopropyl alcohol is used as dampening water. This method provides a variety of advantages concerning workability and accuracy of printed matters, such that the wettability of the non-image areas is improved, the amount of the dampening water can be reduced, it is easy to control the balance between feed rates of printing ink and dampening water, the amount of water emulsified into the printing ink is lowered and the transfer of printing ink to the blanket is improved.

However, isopropyl alcohol is apt to evaporate and, therefore, the use of a special device is required for keeping the concentration thereof constant. This is unfavorable from an economical point of view. Moreover, isopropyl alcohol is malodorous and is toxic and thus the use thereof is not favorable in view of the pollution of the working atmosphere.

In addition, even if the dampening water containing isopropyl alcohol is applied to offset printing in which a dampening molleton roller is commonly used, isopropyl alcohol evaporates from the roller surface and the printing plate surface. Therefore, it cannot show its own effects.

Moreover, the pollution with industrial waste has become a matter of great concern, the regulation with respect to discharge of chromium ions in waste water has become much more severe and there is a tendency of controlling the use of organic solvents such as isopropyl alcohol from the viewpoint of safety and hygiene. For this reason, it has been desired to develop desensitizing agents or dampening water free of such a compound.

Under such circumstances, Japanese Patent Publication for Opposition Purpose (hereunder referred to as "J. P. KOKOKU") Nos. 55-25075, 55-19757 and 58-5797 disclose compositions containing a variety of surfactants which can only slightly reduce the surface tension of water. In general, the dampening water should have a surface tension ranging from 35 to 50 dynes/cm. Therefore, if these compositions are used as dampening water, it is necessary to substantially increase the concentration of surfactants in such a desensitizing agent or dampening water. Furthermore, water is adhered to an ink film or an ink spreads over the surface of water because of vigorous movement of ink and/or water existing below an ink roll, a printing plate and a roll for supplying dampening water which rotate at a high speed, during the practical lithographic printing. However, combinations of surfactants disclosed in the foregoing methods explained above are insufficient to completely solve these problems. Besides, the dampening water containing such surfactants easily causes foaming during pumping and/or stirring thereof.

In addition, U.S. Pat. No. 3,877,372 discloses a solution containing a mixture of ethylene glycol monobutyl ether and at least one of hexylene glycol and ethylene glycol. U.S. Pat. No. 4,278,467 discloses a dampening water containing at least one member selected from the group consisting of n-hexoxyethylene glycol, n-hexoxydiethylene glycol, 2-ethyl-1,3-hexanediol, n-butoxyethylene glycol acetate, n-butoxydiethylene glycol acetate and 3-butoxy-2-propanol. Japanese Patent Unexamined Publication (hereunder referred to as "J. P. KOKAI")No. 57-199693 (U.S. Pat. No. 4,560,410) discloses dampening water containing 2-ethyl-1,3-hexanediol, Ester diol 204(viz., $HOCH_2C(CH_3)_2CH_3OCOC(CH_3)_2CH_2OH$), Hexyl Cellosolve or Hexyl Carbitol and at least one member selected from the group consisting of completely water-soluble propylene glycol, ethylene glycol, dipropylene glycol, diethylene glycol, hexylene glycol, triethylene glycol, tetraethylene glycol, tripropane glycol and 1,5-pentanediol. As these dampening water compositions do not contain isopropyl alcohol, they are preferable in view of safety and hygiene. However, the wettability thereof with respect to non-image areas of a lithographic printing plate comprising an anodized aluminum substrate, during printing operation is not sufficient and it is sometimes observed that the non-image areas are contaminated. In particular, during high speed printing operation, so-called ink spreading of half dot image portions, i.e., phenomenon wherein the shape of half dot images is abnormally deformed, is enlarged and is uneven, is caused. Moreover, 2-ethyl-1,3-hexanediol does not have sufficient solubility in water and thus the use thereof is unfavorable to obtain a concentrated dampening water or an additive for dampening water having a high concentration.

These compounds which are substituted for isopropyl alcohol are in general high boiling-point organic solvents. These high boiling-point organic solvents remain, as residues, after the evaporation of the water from dampening water and would attack image areas of PS plates.

Good printing properties can be anticipated through the use of ether type solvents such as ethylene glycol and propylene glycol for lowering the surface tension as well as polymeric compounds such as cellulose derivatives for imparting hydrophilicity and thickening effect to a dampening water composition, but these compounds have a tendency of causing the clouding phenomenon at a temperature of the order of 30° to 50° C. if they are mixed with or dissolved in an aqueous system. In addition, if other components such as salts are admixed, the clouding points of the composition are further lowered and other components dissolved therein are accordingly separated out. This correspondingly becomes an obstacle in concentrating the liquid and lowers the stability of the concentrated liquid with time. Moreover, the resulting concentrated liquid must be used after diluting with a large amount of water to satisfy the requirements stipulated in the Japanese Fire Services Act (content of organic solvent: less than 40%; ignition point: not less than 40° C.; burning point: not less than 60° C.), but particularly the stability of the resulting diluted liquid is often impaired.

The dampening water in general comprises a hydrophilic polymer compound as a component for preventing contamination thereof. If dampening water containing such a hydrophilic polymer is pumped into the dampening water supply device of a printing press through a circulating system, the dampening water overflows from the circulating system due to foaming. For this reason, a silicone type antifoaming agent is generally added to the dampening water. If a concentrated dampening water composition containing a silicone type antifoaming agent is allowed to stand over a long time period (e.g., 1 to 2 months), however, the components of the composition cause separation (liquid-liquid separation) and the composition is liable to cause foaming.

SUMMARY OF THE INVENTION

Accordingly an object of the present invention is to provide a concentrated dampening water composition for lithographic printing, which does not exhibit disadvantages associated with the foregoing conventional dampening water such as toxicity and deterioration during storage over a long time period; which makes it possible to easily control the feed rate of the dampening water during the printing operation without professional skill; which can prevent contamination or blinding of a printing plate, in particular, that provided with a substrate which has been obtained by electrochemically surface-roughening an aluminum plate and then anodizing the plate and cannot impair the image area of the plate; which can economize the processing and has high stability; which satisfies the requirements stipulated in the Japanese Fire Services Act and in the Japanese Industrial Safety and Health Law and which can easily provide printed matters having high quality.

Under such circumstances, the inventors of this invention have conducted various studies on dampening water for lithographic printing and have found that the foregoing object can effectively be accomplished by the use of a concentrated dampening water composition for lithographic printing which comprises the following components. Thus the inventors have completed the present invention.

Consequently, the concentrated dampening water composition for lithographic printing according to the present invention comprises a) 0.1 to 10% by weight of a hydrophilic polymeric compound having a film-forming ability; b) 0.01 to 15% by weight of a pH buffering agent; c) 5 to 80% by weight of a water-miscible organic solvent having a boiling point of not less than 140° C. and whose 1% by weight aqueous solution has a surface tension of not more than 60 dynes/cm as determined at 25° C.; d) 0.05 to 10% by weight of at least one compound selected from the group consisting of those represented by the following general formulas (I) to (VI); and e) 30 to 80% by weight of water:

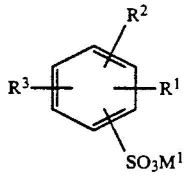
[I]

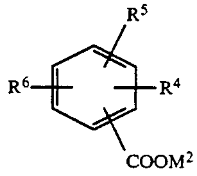
[II]

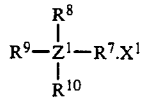
[III]

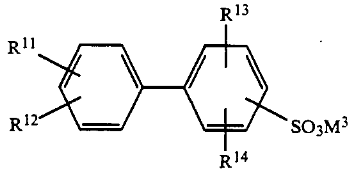
[IV]

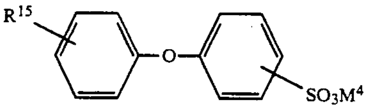
[V]

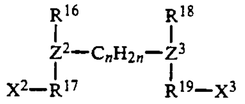
[VI]

wherein $R^1$, $R^2$ and $R^3$ may be the same or different and each represents a hydrogen or halogen atom or a $C_{1-3}$ alkyl, $C_{1-3}$ hydroxyalkyl or hydroxyl group; $R^4$, $R^5$ and $R^6$ may be the same or different and each represents a hydrogen or halogen atom, an alkyl group having 1 to 3 carbon atoms or a mercapto, sulfo, hydroxyl or carboxyl group; $R^7$ to $R^{10}$ and $R^{16}$ to $R^{19}$ each represents a $C_{1-12}$ alkyl, $C_{5-12}$ cyclic alkyl, $C_{1-12}$ hydroxyalkyl, benzyl or substituted or unsubstituted phenyl group; $Z^1$ to $Z^3$ each represents N, P or B; $X^1$ to $X^3$ each represents an anion such as a halogen, nitrate, sulfate, phosphate, hydroxyl, $PF_6^-$ or $BF_4^-$ ion, or a cation such as a $Li^+$, $Na^+$, $K^+$ or $NH_4^+$ ion; n is an integer of 1 to 5; $R^{11}$ and $R^{12}$ each represents a hydrogen atom or an alkyl group having 1 to 6 carbon atoms; $R^{13}$ represents a hydrogen atom or a hydroxyl group; $R^{14}$ represents a hydrogen atom or a sulfo group; $R^{15}$ represents a hydrogen atom or a $C_{1-6}$ alkyl or $C_{1-6}$ hydroxylalkyl group; and $M^1$ to $M^4$ each represents a hydrogen atom or an alkali metal or ammonium ion.

DETAILED EXPLANATION OF THE INVENTION

Component (a)

Component (a), a hydrophilic polymeric compound having a film-forming ability, is a compound which can impart hydrophilicity to non-image areas of lithographic printing plates. Preferred examples thereof include such a natural substance or modified products thereof as gum arabic, starch derivatives; for instance, dextrin, enzyme-modified dextrin, hydroxypropylated enzyme-modified dextrin, carboxymethylated starch, starch phosphate and octenyl succinated starch, alginates or cellulose derivatives, for instance, carboxymethyl cellulose, carboxyethyl cellulose, hydroxyethyl cellulose, methyl cellulose, hydroxypropyl cellulose, hydroxypropyl methyl cellulose, hydroxybutyl methyl cellulose and glyoxal-modified derivatives thereof; and such a synthetic substance as polyvinyl alcohol and derivatives thereof, polyvinyl pyrrolidone, polyacrylamide and copolymers thereof, polyacrylic acid and copolymers thereof, vinyl methyl ether/maleic anhydride copolymer, vinyl acetate/maleic anhydride copolymers and polymer of styrenesulfonic acid and copolymers thereof. Particularly preferred are cellulose derivatives, for instance, hydroxyethyl cellulose, hydroxypropyl cellulose, methyl cellulose, hydroxypropyl methyl cellulose, hydroxybutyl methyl cellulose and glyoxal-modified derivatives thereof, which have a substitution ratio (a ratio of substituted hydroxyl groups in glucose units) of 20 to 90%. These polymers may be used alone or in combination and the amount thereof to be incorporated into the concentrated dampening water composition of the present invention in general ranges from 0.1 to 10% by weight, preferably 0.003 to 1% by weight on the basis of the total weight of the concentrated dampening water composition.

Component (b)

Component (b) is a pH-buffering agent which can be selected from the group consisting of water-soluble organic acids, water-soluble inorganic acids and salts thereof and which exhibits a pH-controlling or buffering effect, an effect of properly etching the surface of a substrate for a lithographic printing plate or a corrosion-inhibitory effect. Examples of preferred organic acids are citric acid, ascorbic acid, malic acid, tartaric acid, lactic acid, acetic acid, gluconic acid, hydroxyacetic acid, oxalic acid, malonic acid, levulinic acid, sulfanilic acid, phytic acid and organic phosphonic acid. Examples of inorganic acids are phosphoric acid, polyphosphoric acid, nitric acid and sulfuric acid. Further, alkali metal salts, alkaline earth metal salts, ammonium salts and/or organic amine salts of the organic acids and/or the inorganic acids may also be used. These organic acids, inorganic acids and/or salts thereof may be used alone or in combination.

The amount of these organic, inorganic acids and/or salts thereof to be added to the concentrated dampening water composition preferably ranges from 0.01 to 15% by weight and is appropriately selected such that pH of the resulting dampening water ranges from 3 to 7. Alternatively, the dampening water composition can also be used in an alkaline region (pH 7 to 11) if alkali metal hydroxides, alkali metal phosphates, alkali metal carbonates and/or silicates are used as the pH-buffering component.

c) Water-Miscible Organic Solvents Having Boiling Points of Not Less Than 140° C. and Whose 1% by Weight Aqueous Solution Has Surface Tensions of Not More Than 60 dynes/cm As Determined at 25° C.

Particularly preferred water-miscible organic solvents are compounds which do not severely give off a bad odor and have high stability in aqueous solutions, low toxicity and low volatility.

Specific examples thereof are diethylene glycol monomethyl ether, triethylene glycol monomethyl ether, diethylene glycol monoethyl ether, triethylene glycol monoethyl ether, ethylene glycol monobutyl ether, diethylene glycol monobutyl ether, triethylene glycol monobutyl ether, ethylene glycol monopropyl ether, diethylene glycol monopropyl ether, triethylene glycol monopropyl ether, ethylene glycol monoisopropyl ether, diethylene glycol monoisopropyl ether, triethylene glycol monoisopropyl ether, diethylene glycol monohexyl ether, triethylene glycol monohexyl ether, ethylene glycol monoisobutyl ether, diethylene glycol monoisobutyl ether, triethylene glycol monoisobutyl ether, propylene glycol monopropyl ether, dipropylene glycol monopropyl ether, tripropylene glycol monopropyl ether, propylene glycol monobutyl ether, dipropylene glycol monobutyl ether, tripropylene glycol monobutyl ether, propylene glycol monoisobutyl ether, dipropylene glycol monoisobutyl ether, tripropylene glycol monoisobutyl ether, ethylene glycol mono-tert-butyl ether, diethylene glycol mono-tert-butyl ether, triethylene glycol mono-tert-butyl ether, propylene glycol mono-tert-butyl ether, dipropylene glycol mono-tert-butyl ether, tripropylene glycol mono-tert-butyl ether, 3-methoxy butanol, tetrahydrofurfuryl alcohol, N-methylpyrrolidone, γ-butyrolactone, octylene glycol, oxyethylene and/or oxypropylene adducts of octylene glycol and 3-methyl-3-methoxybutanol. Particularly preferred are propylene glycol ether type compounds, oxyethylene and/or oxypropylene adducts of octylene glycol, 3-methoxy butanol and 3-methyl-3-methoxybutanol from the viewpoint of safety to man, printing properties or the like. These compounds may be used alone or in any combination and are preferably used in an amount ranging from 5 to 80% by weight.

Preferred examples of Component c) further include compounds represented by the following general formula (VII):

$$R^{20}—O—(—CH_2CH(R^{21})—O)_n—H \qquad (VII)$$

In Formula (VII), $R^{20}$ represents a hydrogen atom or a $C_{1-4}$ alkyl group; $R^{21}$ represents a hydrogen atom or a methyl group; and n is an integer ranging from 1 to 20.

The compounds represented by Formula (VII) are those for improving the wettability of water supply rolls and for stabilizing water pickup. In Formula (VII), if $R^{21}$ is a hydrogen atom, $R^{20}$ is preferably an alkyl group, in particular a butyl group, while if $R^{21}$ is a methyl group, $R^{20}$ is preferably a hydrogen atom or a $C_{1-4}$ alkyl group. If $R^{20}$ is a hydrogen atom, the compound of Formula (VII) preferably comprises a mixture of compounds having an averaged n value of not less than 3.

Specific examples thereof are ethylene glycol monomethyl ether, diethylene glycol monomethyl ether, triethylene glycol monomethyl ether, polyethylene glycol monomethyl ether, ethylene glycol monoethyl ether, diethylene glycol monoethyl ether, triethylene glycol monoethyl ether, ethylene glycol monobutyl ether, diethylene glycol monobutyl ether, triethylene glycol monobutyl ether, ethylene glycol monoisobutyl ether, diethylene glycol monoisobutyl ether, triethylene glycol monoisobutyl ether, ethylene glycol monopropyl ether, diethylene glycol monopropyl ether, triethylene glycol monopropyl ether, ethylene glycol mono-tert-butyl ether, diethylene glycol mono-tert-butyl ether, triethylene glycol mono-tert-butyl ether, ethylene glycol monohexyl ether, diethylene glycol monohexyl ether, triethylene glycol monohexyl ether, ethylene glycol monophenyl ether, diethylene glycol monophenyl ether, triethylene glycol monophenyl ether, propylene glycol, dipropylene glycol, tripropylene glycol, tetrapropylene glycol, propylene glycol monomethyl ether, dipropylene glycol monomethyl ether, tripropylene glycol monomethyl ether, propylene glycol monoethyl ether, dipropylene glycol monoethyl ether, tripropylene glycol monoethyl ether, tetrapropylene glycol monoethyl ether, propylene glycol monopropyl ether, dipropylene glycol monopropyl ether, tripropylene glycol monopropyl ether, propylene glycol monoisopropyl ether, dipropylene glycol monoisopropyl ether, tripropylene glycol monoisopropyl ether, propylene glycol monobutyl ether, dipropylene glycol monobutyl ether, tripropylene glycol monobutyl ether, propylene glycol monoisobutyl ether, dipropylene glycol monoisobutyl ether, tripropylene glycol monoisobutyl ether, propylene glycol mono-tert-butyl ether, dipropylene glycol mono-tert-butyl ether, tripropylene glycol mono-tert-butyl ether, polypropylene glycols having molecular weights ranging from 200 to 1000 and monomethyl ethers, monoethyl ethers, monopropyl ethers, monoisopropyl ethers and monobutyl ethers of these compounds. Among these, preferred are ethylene glycol monobutyl ether, polypropylene glycols having molecular weights ranging from 200 to 1000, propylene glycol monopropyl ether and monoalkyl ($C_1$ to $C_4$) ethers of polypropylene glycol having an averaged added molar number of 2 to 7. These compounds may be used alone or in combination and the amount thereof suitably ranges from 5 to 80, preferably 10 to 70 and more preferably 15 to 40% by weight. Particularly preferred are compounds whose 0.1 to 0.5% by weight aqueous solution has a surface tension of not more than 55 dynes/cm at 25° C.

The compounds of Formula (VII) are preferably used in combination with the compounds represented by the following general formula (VIII):

$$R^{22}—C(R^{23})(OR^{24})—CH_2CH_2OH \quad \text{(VIII)}$$

wherein $R^{22}$ to $R^{24}$ each represents a hydrogen atom or a $C_{1-4}$ alkyl group.

Specific examples of the compounds of Formula (VIII) are 3-methoxybutanol, 3-ethoxybutanol, 3-propoxybutanol, 3-methyl-3methoxybutanol, 3-methyl-3-ethoxybutanol and 3-methyl-3-propoxybutanol. These compounds exhibit effects of accelerating the dissolution of Component a), i.e., the cellulose derivatives and of suppressing the clouding phenomenon observed during the high temperature-storage of the composition and thus are required for the achievement of the concentration of the dampening water composition of the present invention. Among the foregoing compounds, 3-methoxybutanol and 3-methyl-3-methoxybutanol are preferably used. These compounds may be used alone or in combination. The amount thereof to be incorporated into the composition ranges from 1 to 20% by weight.

Further, it is particularly preferred to use the combination of these compounds of Formulas (VII) and (VIII) simultaneously, with at least one compound selected from the group consisting of 2-ethyl-1,3-hexanediol, ethylene oxide and/or propylene oxide adducts of 2-ethyl-1,3-hexanediol, and ethylene oxide and/or propylene oxide adducts of acetylene alcohols or acetylene glycols. As such acetylene alcohols or acetylene glycols, preferably used are ethylene oxide and/or propylene oxide adducts of 2,4,7,9-tetramethyl-5-decyne-4,7-diol, 2,5-dimethyl-3-hexyne-2,5-diol, 3-methyl-1-butyne-3-ol, 3-methyl-1-pentyne-3-ol and 3,6-dimethyl-4-octyne-3,6-diol. These compounds exhibit an excellent ability of lowering the dynamic surface tension and are effective for ensuring uniform wettability of Dahlgren dampening water supply system. These compounds may be used alone or in combination and preferably used in an amount ranging from 0.1 to 30% by weight.

d) Compounds Represented by Formulas (I) to (VI)

Such compounds are those which easily form micelles in an aqueous solution and inter-molecular adducts with hardly soluble components. Specific examples of these compounds include benzenesulfonic acid, p-toluenesulfonic acid, xylenesulfonic acid, cumenesulfonic acid, benzoic acid, salicylic acid, isophthalylsulfonic acid, gallic acid, phenolsulfonic acid, thiosalicylic acid, sodium tetraphenylboron, phenylphenolsulfonic acid, diphenyl ether sulfonic acid, 4-(butylphenyl)-2-hydroxybenzenesulfonic acid and 4-(butylphenyl)-benzenesulfonic acid. In addition, alkali metal salts (such as Na, K, Li salts) and ammonium salts thereof are also preferably used.

Examples thereof effectively used further include hydroxides, chlorides, nitrates, sulfates and phosphates such as tetraphenylphosphonium bromide, tetra-n-butylphosphonium bromide and acidic sulfuric acid salt of tetrabutyl ammonium. Among these compounds used as Component d), preferred are those represented by Formula (III).

Specific examples of compounds of Formula (III) include tetraphenylphosphonium iodide, tetraphenylphosphonium bromide, tetraphenylphosphonium chloride, tetraphenylphosphonium sulfate, tetraphenylphosphonium nitrate, sodium tetraphenylboron, tetra-n-butylphosphonium iodide, tetra-n-butylphosphonium bromide, tetra-n-butylphosphonium chloride, tetra-n-butylphosphonium sulfate, tetra-n-butylphosphonium nitrate, tetrabutylammonium sulfate, tetrabutylammonium nitrate, ethyltriphenylphosphonium bromide, benzyltriphenylphosphonium chloride, tetrabutylphosphonium hydroxide, tetrabutylphosphonium phosphate, ethyltriphenylphosphonium bromide, butyltriphenylphosphonium bromide, diphenylphosphonium chloride, benzyltriphenylphosphonium chloride, tetratolylphosphonium bromide, bis [(benzyl)(diphenyl) phospholandiyl] ammonium chloride and 1,2-bis(diphenylphosphino) ethane bromide.

These compounds can effectively inhibit the deterioration of image areas on a printing plate due to a high boiling point solvent remaining after the evaporation of water which is a marked disadvantage encountered in the use of a conventional dampening water composition containing the solvent, thus specifically exhibit the enhanced effect of protecting the image area and ensure stable printing operations. They are used in an amount ranging from 0.05 to 10% by weight. These compounds may be used in any combination, with the combination of compounds of Formulas (I) and (III) being preferred.

f) Other Components

The concentrated dampening water composition of the present invention may optionally comprise, as a component f), at least one member selected from the group consisting of compounds represented by the following general formulas (IX) and (X) in an amount preferably ranging from 0.01 to 10% by weight:

$$HO-(-CH_2CH_2O-)_a-(-CH_2CH(CH_3)O-)_b-(-CH_2CH_2O-)_c-H \quad (IX)$$

$$R^{25}O-(-CH_2CH_2O-)_d-(-CH_2CH(CH_3)O-)_e-(-CH_2CH_2O-)_f-H \quad (X)$$

wherein $R^{25}$ represents an alkyl group having 8 to 16 carbon atoms or a phenyl group carrying an alkyl group having 1 to 12 carbon atoms; a and c each is an integer ranging from 0 to 20; b is an integer of 30 to 500; d and f each is an integer of 0 to 10; and e is an integer of 4 to 35, provided that d+f is an integer of 1 to 10.

The compounds of Formulas (IX) and (X) serve as antifoaming agents and the antifoaming ability thereof can be controlled by changing the degree of polymerization of the ethylene oxide and propylene oxide moieties. Thus, various kinds of concentrated dampening water compositions can be obtained. Besides, these compounds serve to improve the solubilization of the compounds of Formula (VII) in water and thus can provide concentrated dampening water compositions which do not cause liquid-liquid separation during the long term storage thereof. Further, if the concentrated dampening water composition of the invention is practically used after diluting it with water, these components which have been in the solubilized state are now in a stable dispersion state and thus show the effect of inhibiting foaming of the dampening water.

The compounds of Formula (IX) or (X) are commercially available from, for instance, Union Carbide Inc. and Kao Corporation.

These compounds may be used in combination and, in particular, combinations of compounds of Formula (IX) and compounds of Formula (X) are preferably used. The compounds selected from the group consisting of those represented by Formulas (IX) and (X) are used in a total amount ranging from 0.01 to 10% by weight and preferably 0.05 to 5% by weight.

The concentrated dampening water composition of the invention may further comprise, if desired, other additives. Such additives include, for instance, water-soluble nitrates which have an effect of inhibiting corrosion of printing plates and metallic parts used in printing presses. Specific examples thereof are sodium nitrate, potassium nitrate, ammonium nitrate, magnesium nitrate, calcium nitrate, beryllium nitrate, aluminum nitrate, zinc nitrate, zirconium nitrate, nickel nitrate, manganese nitrate and chromium nitrate. These nitrates may be used alone or in combination. The concentrated dampening water composition comprises these salts in an amount of 0.1 to 20% by weight.

The concentrated dampening water composition of the invention may further comprise a surfactant. Examples of anionic surfactants suitably used in the composition include fatty acid salts, abietic acid salts, hydroxyalkanesulfonic acid salts, alkanesulfonic acid salts, dialkyl sulfosuccinate salts, linear alkyl benzenesulfonate salts, branched alkyl benzenesulfonate salts, alkyl naphthalenesulfonate salts, alkylphenoxy polyoxyethylene-propyl-sulfonate salts, polyoxyethylene alkylsulfophenyl ether salts, sodium salt of N-methyl-N-oleyltaurine, disodium salt Of N-alkylsulfosuccinic acid monoamide, petroleum sulfonic acid salts, sulfated castor oil, sulfated tallow, sulfuric acid ester salts of fatty acid alkyl esters, alkylsulfate ester salts, polyoxyethylene alkyl ether sulfuric acid ester salts, fatty acid monoglyceride sulfuric acid ester salts, polyoxyethylene alkylphenyl ether sulfuric acid ester salts, polyoxyethylene styrylphenyl ether sulfuric acid ester salts, alkylphosphate ester salts, polyoxyethylene alkyl ether phosphoric acid ester salts, polyoxyethylene alkylphenyl ether phosphoric acid ester salts, partially saponified styrene-maleic anhydride copolymers, partially saponified olefin-maleic anhydride copolymers and condensates of naphthalene sulfonic acid salt and formalin. Among these, particularly preferred are dialkylsulfosuccinic acid salts, alkylsulfate ester salts and alkylnaphthalenesulfonic acid salts.

Examples of non-ionic surfactants suitably used in the dampening water composition of the invention include polyoxyethylene alkyl ethers, polyoxyethylene alkylphenyl ethers, polyoxyethylene polystyrylphenyl ethers, polyoxyethylene polyoxypropylene alkyl ethers, partial esters of glycerin-fatty acids, partial esters of sorbitan-fatty acids, partial esters of pentaerythritol-fatty acids, propylene glycol monofatty acid ester, partial esters of sucrose-fatty acids, partial esters of polyoxyethylene sorbitan fatty acids, partial esters of polyoxyethylene sorbitol fatty acids, polyethylene glycol fatty acid esters, partial esters of polyglycerin fatty acids, castor oils modified with polyoxyethylene, partial esters of polyoxyethylene glycerin fatty acids, fatty acid diethanolamides, N,N-bis-2-hydroxyalkylamines, polyoxyethylenealkylamines, triethanolamine fatty acid ester, polyoxyethylenepolyoxypropylene block copolymers, trialkylamine oxides, fluorine atom-containing surfactants and silicon atom-containing surfactants. Particularly preferred are polyoxyethylene alkylphenyl ethers and polyoxyethylenepolyoxypropylene block copolymers among others.

Finally, examples of cationic surfactants useful in the invention include alkylamine salts, quaternary ammonium salts, polyoxyethylene alkylamine salts and polyethylene polyamine derivatives.

These surfactants may be used alone or in combination and the amount thereof to be incorporated in the dampening water composition is not more than 10% by weight taking the foaming into consideration and preferably 0.01 to 3.0% by weight based on the total weight of the composition.

In addition to the foregoing components, the dampening water composition of the invention may further comprise a wetting agent capable of suppressing drying to make usability thereof good. Examples of such suitable wetting agents include ethylene glycol, propylene glycol, triethylene glycol, butylene glycol, hexylene glycol, diethylene glycol, dipropylene glycol, glycerin, trimethylol propane and diglycerin. These wetting agents may be used alone or in combination. The amount thereof preferably ranges from 0.1 to 25% by weight.

Besides, the concentrated dampening water composition of the invention may further contain at least one chelating agent. Usually, the concentrated dampening water composition having the foregoing composition is diluted with tap water or well water prior to use as dampening water. Tap water or well water generally contains ions such as calcium ions which exert adverse influences on printing and the presence thereof often causes contamination of printed matters. These problems can effectively be solved if the dampening water composition comprises a chelating agent.

Examples of preferred chelating agents include such aminopolycarboxylic acids or salts thereof as ethylenediaminetetraacetic acid and potassium or sodium salt thereof, diethylenetriamine-pentaacetic acid and potassium or sodium salt thereof, triethylenetetramine-hexaacetic acid and potassium or sodium salt thereof, hydroxyethyl ethylenediaminetriacetic acid and potassium or sodium salt thereof and nitrilotriacetic acid and potassium or sodiunm salt thereof; and such an organophosphonic acid, phosphonoalkane tricarboxylic acid or salts thereof as 2-phosphonobutane-tricarboxylic acid-1, 2,4 and potassium or sodium salt thereof, 2-phosphonobutanetricarboxylic acid-2,3,4 and potassium or sodium salt thereof, 1-phosphonoethane-tricarboxylic acid-2,2,2 and potassium or sodium salt thereof, 1-hydroxyethane-1,1-diphosphonic acid and potassium or sodium salt thereof and aminotri(methylenephosphonic acid) and potassium or sodium salt thereof.

Organic amine salts of the foregoing chelating agents may be used effectively instead of potassium and sodium salts thereof. These chelating agents should be selected so that they are stably present in the dampening water and exhibit no printing inhibitory effect. These chelating agents are used in the concentrated dampening water composition in an amount ranging from 0.001 to 10% by weight, preferably 0.01 to 5% by weight on the basis of the total weight of the composition.

Moreover, the concentrated dampening water composition of the invention may comprise other additives such as coloring agents, anti-foaming agents, anti-corrosion agents and preservatives. For instance, coloring agent may preferably be food dyes. Examples of such dyes include yellow dyes such as CI Nos. 19140 and 15985; red dyes such as CI Nos. 16185, 45430, 16255, 45380 and 45100; purple dyes such as CI No. 42640; blue dyes such as CI Nos. 42090 and 73015; and green dyes such as CI No. 42095. Preferred antifoaming agents are, for instance, silicone type ones. They may be in the form of either emulsion dispersions or solubilized solutions. These other additives may preferably be used in an amount of 0.001 to 1% by weight.

Examples of anti-corrosion agents are benzotriazole, 5-methylbenzotriazole, 5-methoxybenzotriazole, 4-chlorobenzotriazole, 4-bromobenzotriazole, 4-bromo-6-methylbenzotriazole and 4-bromo-6-trifluoromethylbenzotriazole as well as these compounds which are substituted with alkali metals (K, Na, Li) or $NH_4$ at the 1H-positions, benzimidazole and derivatives thereof and mercapto compounds and/or thioether compounds such as mercaptoacetic acid, 2-mercaptopropionic acid, 3-mercaptopropionic acid, 4-mercaptobutanoic acid, 2,4-dimercaptobutanoic acid, 2-mercaptotetradecanoic acid, 2-mercaptomyristic acid, mercaptosuccinic acid, 2,3-dimercaptosuccinic acid, cysteine, N-acetylcysteine, N-(2-mercaptopropionyl)glycine, N-(2-mercapto-2-methylpropionyl) glycine, N-(3-mercaptopropionyl)glycine, N-(2-mercapto-2-methylpropionyl)cysteine, penicillamine, N-acetylpenicillamine, glycine/cysteine/glutamine condensate, N-(2,3-dimercaptopropionyl)glycine, 2-mercaptonicotinic acid, thiosalicylic acid, 3-mercaptobenzoic acid, 4-mercaptobenzoic acid, 3-carboxy-2-mercaptopyridine, 2-mercaptobenzothiazole-5-carboxylic acid, 2-mercapto-3-phenylpropanoic acid, 2-mercapto-5-carboxyethylimidazole, 5-mercapto-1-(4-carboxyphenyl)tetrazole, N-(3,5-dicarboxyphenyl)-2-mercaptotetrazole, 2-(1,2-dicarboxyethylthio)-5-mercapto-1,3,4-thiadiazole, 2-(5-mercapto-1,3,4-thiadiazolylthio)hexanoic acid, 2-mercaptoethanesulfonic acid, 2,3-dimercapto-1-propanesulfonic acid, 2-mercaptobenzenesulfonic acid, 4-mercaptobenzenesulfonic acid, 3-mercapto-4-(2-sulfophenyl)-1,2,4-triazole, 2-mercaptobenzothiazole-5-sulfonic acid, 2-mercaptobenzimidazole-6-sulfonic acid, mercaptosuccinimide, 4-mercaptobenzenesulfonamide, 2-mercaptobenzimidazole-5-sulfonamide, 3-mercapto-4-(2-(methylaminosulfonyl)ethoxy)toluene, 3-mercapto-4-(2-(methylsulfonylamino)ethoxy)toluene, 4-mercapto-N-(p-methylphenylsulfonyl)benzamide, 4-mercaptophenol, 3-mercaptohydroquinone, 2-mercaptophenol, 3,4-dimercaptotoluene, 2-mercaptohydroquinone, 2-thiouracil, 3-hydroxy-2-mercaptopyridine, 4-hydroxythiophenol, 4-hydroxy-2-mercaptopyridine, 4,6-dihydroxy-2-mercaptopyridine, 2,3-dihydroxypropylmercaptan, 2-mercapto-4-octylphenyl methanesulfonylaminoethyl ether, 2-mercapto-4-octylphenol methaneaminosulfonylbutyl ether, thiodiglycollic acid, thiodiphenol, 6,8-dithiooctanoic acid, 5-methoxy-2-mercaptobenzimidazole, 2-mercaptobenzimidazole-5-sulfonic acid and alkali metal, alkaline earth metal, ammonium and organic amine salts thereof. These compounds are preferably used in an amount of 0.0001 to 5% by weight. They may be used alone or in combination.

Examples of preservatives include phenol or derivatives thereof, formalin, imidazole derivatives, sodium dehydroacetate, 4-isothiazolin-3-one derivatives, benzisothiazolone, benzotriazole derivatives, amidine or guanidine derivatives, quaternary ammonium salts, pyridine or quinoline derivatives, diazine or triazole derivatives, oxazole and oxazine derivatives. These preservatives are used in such an amount that they can effectively and steadily inhibit the growth of bacteria, mold, yeast or the like and the amount thereof varies depending on the kinds of bacteria, mold, yeast or the like to be controlled, but preferably ranges from 0.01 to 4% by weight on the basis of the total weight of the concentrated dampening water composition. In this respect, these preservatives are preferably used in combination so that the composition is effective for controlling various kinds of mold, bacteria and yeast.

The concentrated dampening water composition of the present invention can be obtained by dissolving the foregoing components in water, preferably desalted water, i.e., pure water to give an aqueous solution. The concentrated composition is diluted 10 to 100 times with tap water or well water prior to use.

The lithographic plates for which the concentrated dampening water of the present invention can be used include presensitized light-sensitive lithographic plates (PS plates), deep-etch plate, multilayer metal plates such as bimetal and trimetal layer plates, direct masters, electrophotographic lithographic plates, etc.

The presensitized light-sensitive lithographic plates (PS plates) used in the present invention comprise a support having a hydrophilic surface and light-sensitive layers containing a light-sensitive composition placed thereon. The light-sensitive composition includes those containing a diazo compound, those containing an azide compound as described in British Patent Nos. 1,235,281 and. 1,495,861, those containing a photo-crosslinking photopolymer as described in U.S. Pat. Nos. 3,860,426, those containing a photo-polymerizable photopolymer as described in U.S. Pat. Nos. 4,072,528 and 4,072,527, photoconductive compositions as described in J. P. KOKAI Nos. 56-19063 and 56-29250, and silver halide emulsion compositions as described in J. P. KOKAI Nos. 52-62501 and 56-111852.

Among these light-sensitive compositions, those containing a diazo compound are preferably used, because they have excellent properties such as storability of the light-sensitive layers, developing properties such as developing latitude, image-forming properties such as quality of the image, and printing properties such as ink-receptivity, sensitivity and abrasion resistance, and the developer to be applied thereto substantially does not pollute the environment.

The light-sensitive compositions containing the diazo compound can be classified into negative-working type and positive-working type.

The negative-working light-sensitive compositions containing the diazo compound are those containing a light-sensitive diazo compound and preferably a polymeric compound. As the light-sensitive diazo compounds, those known in the art can be used. Preferred examples of them include salts of organic solvent-soluble diazo resins such as a salt of a condensate of p-diazodiphenylamine and formaldehyde or acetaldehyde with hexafluorophosphate or with 2-hydroxy-4-methoxybenzophenone-5-sulfonate.

Preferred polymeric compounds include, for example, acrylic acid or methacrylic acid copolymers, crotonic acid copolymers, itaconic acid copolymers, maleic acid copolymers, cellulose derivatives having a carboxyl group at a side chain thereof, polyvinyl alcohol derivatives having a carboxyl group at a side chain thereof, hydroxyalkyl acrylate or methacrylate copolymers having a carboxyl group at a side chain thereof, and unsaturated polyester resins having a carboxyl group.

The diazo compounds contained in the positive-working light-sensitive composition are known. Typical examples of them include o-quinone diazides such as preferably o-naphthoquinone diazide compounds. Among the o-naphthoquinone diazide sulfonic acid esters or o-naphthoquinone diazide carboxylic acid esters of various hydroxyl compounds; and o-naphthoquinone diazide sulfonic acid amides or o-naphthoquinone diazide carboxylic acid amides of aromatic amino compounds. Preferred hydroxyl compounds include condensate resins comprising a phenol and a carbonyl group-containing compound. The phenols include phenol per se, cresol, resorcinol and pyrogallol. The carbonyl group-containing compounds include formaldehyde, benzaldehyde and acetone. Preferred hydroxyl compounds include phenol/formaldehyde resin, cresol/formaldehyde resin, pyrogallol/acetone resin and resorcinol/benzaldehyde resin.

Typical examples of the o-quinone diazide compounds include esters of benzoquinone-(1,2)-diazidosulfonic acid or naphthoquinone-(1,2)-diazidosulfonic acid with phenol/formaldehyde resin or cresol/formaldehyde resin; the ester of naphthoquinone-(1,2)-diazido(2)-5-sulfonic acid with resorcinol/benzaldehyde resin as described in J. P. KOKAI No. 56-1044; the ester of naphthoquinone-(1,2)-diazidosulfonic acid with pyrogallol/acetone resin as described in U.S. Pat. No. 3,635,709; and the ester of naphthoquinone-(1,2)-diazido-(2)-5-sulfonic acid with resorcinol/pyrogallol/acetone copolycondensate as described in J. P. KOKAI No. 55-76346. Other o-quinone diazide compounds usable herein include the esterification reaction product of a polyester having a terminal hydroxyl group with o-naphthoquinone diazidosulfonyl chloride as described in J. P. KOKAI No. 50-117503; the esterification reaction product of p-hydroxystyrene homopolymer or copolymer thereof with another copolymerizable monomer with o-naphthoquinone diazidosulfonyl chloride as described in J. P. KOKAI No. 50-113305; the ester or bisphenol/formaldehyde resin with o-quinone diazidosulfonic acid as described in J. P. KOKAI No. 54-29922; the condensate of o-quinonediazidosulfonyl chloride with a copolymer of an alkyl acrylate, acryloyloxyalkyl carbonate and hydroxyalkyl acrylate as described in U.S. Pat. No. 3,859,099; the reaction product of o-quinonediazidesulfonic acid with a copolymerization product of styrene and a phenol derivative as described in J. P. KOKOKU No. 49-17481; the amide of o-naphthoquinone diazide sulfonic acid or o-naphthoquinone diazidecarboxylic acid with a copolymer of p-aminostyrene and a copolymerizable monomer as described in U.S. Pat. No. 3,759,711; and the ester of a poly-hydroxybenzophenone with o-naphthoquinone diazide sulfonyl chloride.

Although these o-quinone diazide compounds can be used singly, it is preferably mixed with an alkali-soluble resin to form a mixture to be used as a light-sensitive layer. Preferred alkali-soluble resins include novolak-type phenol resins such as phenol-formaldehyde resin, cresol-formaldehyde resin, and the phenol/cresol-formaldehyde copolycondensate resin described in J. P. KOKAI No. 55-57841. It is more preferred to use the above-described phenolic resin in combination with the condensate of a phenol or cresol substituted with an alkyl group having 3 to 8 carbon atoms with formaldehyde such as t-butylphenol/formaldehyde resin as described in J. P. KOKAI No. 50-125806.

If necessary, an alkali-soluble resin other than the above-described alkali-soluble novolak-type phenolic resin can be incorporated therein. Examples of them include styrene/acrylic acid copolymer, methyl methacrylate/methacrylic acid copolymer, alkali-soluble polyurethane resin, and the alkali-soluble vinyl resins and alkali-soluble polybutyral resins described in J. P. KOKOKU No. 52-28401.

The amount of the o-quinonediazide compound is preferably 5 to 80% by weight, particularly preferably 10 to 50% by weight, based on the total solid components in the light-sensitive composition. The amount of the alkali-soluble resin is preferably 30 to 90% by weight, particularly preferably 50 to 85% by weight, based on the total solid components in the light-sensitive composition.

One or more light-sensitive composition layers can be formed. If necessary, additives such as a dye, plasticizer and printing-out component can be added thereto.

The amount of the light-sensitive composition to be applied to the support is preferably 0.1 to 7 $g/m^2$, more preferably 0.5 to 4 $g/m^2$.

If necessary, a primer layer can be formed between the support and the light-sensitive composition layer. The primer layer comprises, for example, a metal salt and a hydrophilic cellulose as described in J. P. KOKOKU No. 57-16349, polyvinyl phosphonic acid as described in J. P. KOKAI NO. 46-35685, $\beta$-alanine as described in J. P. KOKAI No. 60-149491 or triethanolamine hydrochloride as described in J. P. KOKAI No. 60-232998.

The supports usable for the light-sensitive lithographic plate to be used in the present invention are those made of aluminum (including an aluminum alloy), paper or a plastic (such as polyethylene, polypropylene, polyethylene terephthalate, cellulose diacetate, cellulose triacetate, cellulose propionate, polyvinyl acetal or polycarbonate) and also composite supports composed of a metal such as zinc or copper laminated with aluminum or having an aluminum layer formed thereon by vapor deposition.

The aluminum surface is preferably roughened in order to increase water retention and to improve the adhesion to the light-sensitive layer.

The roughening methods include generally known brush abrasion method, ball abrasion method, electrolytic etching method, chemical etching method, liquid honing method and sandblasting method as well as a combination of them. Among them, the brush abrasion method, electrolytic etching method, chemical etching method and liquid honing method are preferred. A roughening method wherein the electrolytic etching step is included is particularly preferred. As an electrolytic bath to be used in the electrolytic etching, an aqueous solution of an acid, alkali or a salt thereof or an aqueous solution containing an organic solvent is used. Among them, an electrolytic solution containing hydrochloric acid, nitric acid or a salt thereof is preferred. The surface-roughened aluminum plate is desmutted, if necessary, with an aqueous acid or alkali solution. The aluminum plate thus formed is desirably subjected to anodic oxidation, and particularly preferably it is treated with a bath containing sulfuric acid or phosphoric acid. Further, if necessary, the plate can be subjected to a surface treatment such as sealing treatment or immersion in an aqueous solution of potassium fluorozirconate.

The PS plate thus prepared is exposed to a light source rich in active ray such as a carbon arc lamp, a mercury lamp, a metal halide lamp or a tungsten lamp through a transparent original and then developed by a wet developing method.

The developer to be used in the above-described developing step is an alkaline solution containing water as a main solvent. It may contain an organic solvent, anionic surfactant, inorganic salt, etc. depending on the alkali used.

It is also effective to incorporate an anti-foaming agent, a wetting agent, etc. into the developer, if necessary.

After the image-forming exposure, the PS plate is developed with the developer by various known methods. They include, for example, a method wherein the PS plate after the image forming exposure is immersed in the developer, a method wherein the developer is sprayed onto the light-sensitive layer of the PS plate through many nozzles, a method wherein the light-sensitive layer of the PS plate is wiped with a sponge impregnated with the developer, and a method wherein the developer is applied to the surface of the light-sensitive layer of the PS plate with a roller. After the application of the developer to the light-sensitive layer of the PS plate, its surface can be lightly rubbed with a brush or the like.

After the above-described development process, the PS plate is further subjected to a combination of the steps of washing with water, rinsing, desensitization, etc. to complete the development thereof.

The concentrated dampening water composition of the present invention is very excellent in printing properties and does not impair image areas of printing plates although a high boiling point solvent is employed. Moreover, the composition has excellent stability with time, satisfies the requirements stipulated in the Japanese Fire Services Act, Industrial Safety and Health Law or the like and can steadily provide good copies.

The concentrated dampening water composition of the present invention will hereunder be explained in more detail with reference to the following non-limitative working Examples. In addition, the effects practically achieved will also be discussed in detail in comparison with Comparative Examples given below. In the following Examples and Comparative Examples, the term "%" means "% by weight", unless otherwise specified.

EXAMPLES 1 TO 5 AND COMPARATIVE EXAMPLES 1 TO 3

As shown in Table 1, concentrated dampening water compositions 1 to 5 of the present invention and comparative dampening water compositions 1 to 3 were prepared.

The resulting compositions were diluted 40 times with water and they were tested as dampening water. The results thus obtained are summarized in the following Tables 2 and 3.

TABLE 1

| | Examples | | | | | Comp. Ex | | |
|---|---|---|---|---|---|---|---|---|
| Component | 1 | 2 | 3 | 4 | 5 | 1 | 2 | 3 |
| a) Film-Forming Polymer: | | | | | | | | |
| hydroxypropyl cellulose | 6 | — | 5 | — | 3 | 6 | 3 | 3 |
| polyvinyl methyl ether/maleic | — | 6 | — | 5 | 3 | — | 3 | 3 |
| anhydride copolymer gum arabic | — | — | 1 | 1 | — | — | — | — |
| b) pH Buffering Agent: | | | | | | | | |
| phosphoric acid (85%) | 5 | 5 | 5 | 5 | 5 | 5 | 5 | 5 |
| ammonium secondary phosphate | 4 | 4 | 4 | 4 | 4 | 4 | 4 | 4 |
| ammonium secondary citrate | 10 | 10 | 10 | 10 | 10 | 10 | 10 | 10 |
| c) High Boiling Point Solvent: | | | | | | | | |
| 3 mole ethylene oxide adduct of octylene glycol | 20 | 20 | — | — | 50 | 20 | 50 | — |
| diethylene glycol monobutyl ether | 250 | — | — | 140 | 40 | 250 | 40 | — |
| propylene glycol monopropyl ether | — | 250 | 200 | — | 180 | — | 180 | 250 |
| N-methylpyrrolidone | — | — | 70 | 130 | — | — | — | — |
| d) Additives: | | | | | | | | |
| sodium phenylsulfonate | 20 | — | 10 | 10 | 10 | — | — | — |
| sodium isophthalylsulfonate | — | 20 | — | 20 | 10 | — | — | — |

TABLE 1-continued

| Component | Examples | | | | | Comp. Ex | | |
|---|---|---|---|---|---|---|---|---|
| | 1 | 2 | 3 | 4 | 5 | 1 | 2 | 3 |
| tetraphenylphosphonium bromide | 5 | — | 10 | — | 10 | — | — | — |
| tetra-n-butylphosphonium bromide | — | 10 | — | — | — | — | — | — |
| Nitric Acid Salts: | | | | | | | | |
| magnesium nitrate ($6H_2O$) | 10 | 10 | 10 | 10 | 10 | 10 | 10 | 10 |
| ammonium nitrate | 5 | 5 | 5 | 5 | 5 | 5 | 5 | 5 |

In Table 1, the numerical values are expressed in terms of grams. The foregoing components were diluted to 1000 ml with water.

Test Method: FPS's (positive-working PS plates available from Fuji Photo Film Co., Ltd.) were imagewise exposed to light through a positive film carrying solid black portions and 30% half-tone dot portions, followed by development and gumming up using PS Automatic Developing Machine 800EII, a developer DP-4 for positive-working PS plates (diluted 8 times with water) and a finisher FP for positive-working PS plates (diluted 2 times with water)(both available from Fuji Photo Film Co., Ltd.) to give lithographic printing plates. Then the resulting printing plates were fitted to Komori LITHRONE Printing Press (provided with Komorimatic) and printing operations were performed using MK-V Sumi Ink (available from Toyo Ink Mgf. Co., Ltd.) and dampening water prepared by diluting the concentrated compositions of Examples 1 to 5 and Comparative Examples 1 to 3, 40 times with tap water.

At this stage, printing properties were evaluated and there were observed deteriorations (erosion) of the image areas on the solid portions and 30% half-tone dot portions of the PS plates which had been allowed to stand for 60 minutes after a slight excess of the dampening water was supplied before stopping the printing press. The results obtained are summarized in Table 2.

a. Contamination of Metering Roll: The degree of contamination of the metering roll for sending up water due to the adhesion of the printing ink was examined according to the following three-stage evaluation.

| | |
|---|---|
| Good: | A |
| Slightly Contaminated: | B |
| Contaminated: | C |

b. Bleed Properties: 0sing an ink (available from Dainippon Ink and Chemicals Inc. under the trade name of Apex G Magenta Type-S), the operation of the printing press was stopped after printing 5,000 and 10,000 sheets of printed matters, and at these stages, the degree of the non-image area which was blurred with the ink from the image areas was estimated according to the following three stages evaluation:

| | |
|---|---|
| There is no portion blurred with ink: | A |
| There is some portions blurred with ink: | B |
| There are a lot of portions blurred with ink: | C |

c. Emulsifying Properties: After printing 10,000 sheets of printed matters, the emulsified state of the ink on a roll for kneading ink was examined and estimated according to the following three-stage evaluation:

| | |
|---|---|
| Good: | A |
| Not so good: | B |

-continued

| | |
|---|---|
| Bad: | C |

d. Continuous Stability: 10,000 sheets of printed matters were obtained using pure water as dampening water to obtain the amount of dampening water which did not cause contamination (minimum amount of water sent up) and printing was performed using various dampening water in the minimum sent up amount to determine the number of printed matters obtained till contamination was caused.

| | |
|---|---|
| More than 10,000: | A |
| 10,000 to 3,000: | B |
| Less than 3,000: | C |

e. Deterioration of Image Area: The deterioration (erosion) of the solid portions and 30% half-tone dot portions were determined by visually observing the plates which had been allowed to stand for 60 minutes after stopping the printing press and the examination was performed according to the following three-stage evaluation.

| | |
|---|---|
| No problem | A |
| Slightly deteriorated | B |
| Deteriorated | C |

The dampening water of Examples 1 to 5 is excellent in all of the foregoing tests, i.e., (a) contamination of metering roll, (b) bleed properties, (c) emulsifying properties, (d) continuous stability, (e) deterioration of image area and could provide good printed matters. The results are listed in Table 2.

TABLE 2

| | Example | | | | | Comp. Ex. | | |
|---|---|---|---|---|---|---|---|---|
| | 1 | 2 | 3 | 4 | 5 | 1 | 2 | 3 |
| Contamination of Metering Roll | A | A | A | A | A | A | A | B |
| Ink Bleed Properties | A | A | A | A | A | A | A | B |
| Emulsifying Properties | A | A | A | A | A | A | A | A |
| Continuous Stability | A | A | A | A | A | A | A | C |
| Deterioration of Image Area | A | A | A | A | A | C | C | A |

Then the printing press was stopped, each dampening water (5, 10, 20 or 50 μl) was dropped on the solid and 30% half-tone dot portions of the PS plate using a syringe and allowed to stand for 60 minutes. Then the printing operation was again started to evaluate the degree of deterioration of the image area. The results thus obtained are listed in the following Table 3.

TABLE 3

| | Example | | | | | Comp. Ex. | | |
|---|---|---|---|---|---|---|---|---|
| | 1 | 2 | 3 | 4 | 5 | 1 | 2 | 3 |
| 5 μl | A | A | A | A | A | C | C | B |

TABLE 3-continued

| | Example | | | | | Comp. Ex. | | |
|---|---|---|---|---|---|---|---|---|
| | 1 | 2 | 3 | 4 | 5 | 1 | 2 | 3 |
| 10 μl | A | A | A | A | A | C | C | B |
| 20 μl | A | A | A | A | A | B | C | A |
| 50 μl | A | A | A | A | A | B | C | A |

A: no problem
B: slightly deteriorated (ring-like mark)
C: deteriorated

The dampening water of Examples 1 to 5 did not cause deterioration of the image area of the lithographic printing plate and the latter was completely protected as compared with those observed in Comparative Examples.

EXAMPLES 6 TO 10 AND COMPARATIVE EXAMPLES 4 TO 6

Dampening compositions 6 to 10 (Examples) and 4 to 6 (Comparative Examples) (details thereof are shown in Table 4) were prepared in the same manner used in Examples 1 to 5 and Comparative Examples 1 to 3. In Table 4, the numerical values are expressed in terms of grams. These compositions were diluted to 1000 ml with water. The test results obtained are summarized in Tables 5 and 6.

TABLE 4

| | Examples | | | | | Comp Ex. | | |
|---|---|---|---|---|---|---|---|---|
| Component | 6 | 7 | 8 | 9 | 10 | 4 | 5 | 6 |
| a) Film-Forming Polymer: | | | | | | | | |
| Hydroxyproply cellulose (LEG) (available from Shin-Etsu Chemical Co., Ltd.) | 10 | — | — | 10 | 10 | 10 | — | 10 |
| Metrose 60SH50 (Methoxy group/hydropropoxy group; Shin-Etsu Chemical Co., Ltd.) | — | 7 | — | — | — | — | 7 | — |
| Highmetrose 60SH50 (the foregoing compound modified with glyoxal; Shin-Etsu Chemical Co., Ltd.) | — | — | 5 | — | — | — | — | — |
| b) pH Buffering Agent: | | | | | | | | |
| phosphoric acid (85%) | 5 | 5 | 5 | 5 | 5 | 5 | 5 | 5 |
| ammonium secondary phosphate | 4 | 4 | 4 | 4 | 4 | 4 | 4 | 4 |
| ammonium secondary citrate | 10 | 10 | 10 | 10 | 10 | 10 | 10 | 10 |
| c) Wettability Improving Agent: | | | | | | | | |
| 2-ethyl-1,3-hexanediol | 20 | — | — | 20 | 10 | 20 | 20 | — |
| 3 mole oxyethylene adduct of 2-ethyl-1,3-hexanediol | — | 20 | 120 | 100 | 10 | — | — | — |
| d) Auxiliary Agent (1): | | | | | | | | |
| propylene glycol monopropyl ether | 250 | 250 | — | — | 150 | 250 | 250 | 250 |
| dipropylene glycol monobutyl ether | — | — | 150 | 150 | 100 | — | — | — |
| e) Auxiliary Agent (2) (clouding poind improver): | | | | | | | | |
| 3-methoxybutanol | 130 | 130 | — | — | 130 | 130 | — | 150 |
| 3-methyl-3-methoxybutanol | — | — | 130 | 130 | — | — | — | — |
| f) Stabilizer for Image Area: | | | | | | | | |
| tetraphenylphosphonium bromide | 10 | — | 10 | 7.5 | 7.5 | — | — | — |
| tetraphenylphosphonium nitrate | — | 10 | −7.5 | — | — | — | — | — |
| tetrabutylphosphonium bromide | — | — | 5 | — | 7.5 | — | — | — |

Test Methods: Various properties were determined in the same manner used in Example 1. The results obtained are listed in the following Table 5. In addition, clouding points of the compositions were also determined and the results were summarized in Table 5.

TABLE 5

| | Example | | | | | Comp. Ex. | | |
|---|---|---|---|---|---|---|---|---|
| | 6 | 7 | 8 | 9 | 10 | 4 | 5 | 6 |
| Contamination of Metering Roll | A | A | A | A | A | A | A | B |
| Ink Bleed Properties | A | A | A | A | A | A | A | B |
| Emulsifying Properties | A | A | A | A | A | A | A | A |
| Continuous Stability | A | A | A | A | A | A | A | C |

TABLE 5-continued

| | Example | | | | | Comp. Ex. | | |
|---|---|---|---|---|---|---|---|---|
| | 6 | 7 | 8 | 9 | 10 | 4 | 5 | 6 |
| Deterioration of Image Area | A | A | A | A | A | C | C | A |
| Clouding Point (°C.) | 50~53 | 55~57 | 60~62 | 48~50 | 50~52 | 50~53 | 31~33 | 54~56 |

Then the printing press was stopped, each dampening water (5, 10, 20 or 50 μl) was dropped on the solid and 30% half-tone dot portions of the PS plate using a syringe and allowed to stand for 60 minutes. Then the printing operation was again started to evaluate the degree of deterioration of the image area. The results thus obtained are listed in the following Table 6.

TABLE 6

| | Example | | | | | Comp. Ex. | | |
|---|---|---|---|---|---|---|---|---|
| | 6 | 7 | 8 | 9 | 10 | 4 | 5 | 6 |
| 5 μl | A | A | A | A | A | C | C | B |
| 10 μl | A | A | A | A | A | C | C | B |
| 20 μl | A | A | A | A | A | C | C | A |
| 50 μl | A | A | A | A | A | C | C | B |

A: no problem
B: slightly deteriorated (ring-like mark)
C: deteriorated

The dampening water of Examples 6 to 10 did not cause deterioration of the image area of the lithographic printing plate and the latter was completely protected as compared with those of Comparative Examples 4 to 6.

EXAMPLES 11 TO 15 AND COMPARATIVE EXAMPLES 7 TO 9

Dampening water compositions 11 to 15 (Examples) and 7 to 9 (Comparative Examples) (details thereof are shown in Table 7) were prepared in the same manner used in Examples 1 to 5 and Comparative Examples 1 to 3. In Table 7, the numerical values are expressed in terms of grams. These compositions were diluted to 1000 ml with water. The test results obtained are summarized in Tables 8 and 9.

TABLE 7

| Component | Examples 11 | 12 | 13 | 14 | 15 | Comp. Ex. 7 | 8 | 9 |
|---|---|---|---|---|---|---|---|---|
| a) Film-Forming Hydrophilic Polymer: | | | | | | | | |
| Hydroxypropyl cellulose (LEG) (available from Shin-Etsu Chemical Co., Ltd.) | 10 | 10 | 5 | — | — | 10 | 5 | — |
| Metrose 60SH50 (methoxy group/hydropropoxy group; Shin-Etsu Chemical Co., Ltd.) | — | — | — | 5 | — | — | — | 5 |
| Highmetrose 60SH50 (the foregoing compound modified with glyoxal; Shin-Etsu Chemical Co., Ltd.) | — | — | 5 | — | 5 | — | 5 | — |
| b) pH Buffering Agent: | | | | | | | | |
| phosphoric acid (85%) | 5 | 5 | 5 | 5 | 5 | 5 | 5 | 5 |
| ammonium secondary phosphate | 4 | 4 | 4 | 4 | 4 | 4 | 4 | 4 |
| ammonium secondary citrite | 10 | 10 | 10 | 10 | 10 | 10 | 10 | 10 |
| c) Wettability Improving Agent: | | | | | | | | |
| propylene glycol monopropyl ether | 200 | 200 | 150 | 150 | 100 | 200 | 150 | 150 |
| polypropylene glycol (molecular weight = 400) | 50 | — | 50 | 50 | 100 | 50 | 50 | 50 |
| polypropylene glycol (molecular weight = 400) monomethyl ether | — | 50 | 50 | 50 | 50 | — | 50 | 50 |
| d) Auxiliary Agent: | | | | | | | | |
| 3-methoxybutanol | 100 | 100 | 100 | — | — | 100 | — | — |
| 3-methyl-3-methoxybutanol | — | — | — | 100 | 100 | — | — | 100 |
| e) Stabilizer for Imige Area: | | | | | | | | |
| tetraphenylphosphonium bromide | 10 | — | 10 | 5 | — | — | — | — |
| sodium p-toluenesulfonate | — | — | 20 | — | — | — | — | — |
| tetrabutylphosphonium bromide | — | 10 | — | 10 | 10 | — | — | — |
| sodium diphenyl ether sulfonate | — | — | — | — | 5 | — | — | — |
| f) Water | (ad. 1000 ml) | | | | | | | |

Test Methods: Various properties were determined in the same manner used in Examples 1 to 5 and Comparative Examples 1 to 3. The results obtained are listed in the following Table 8.

TABLE 8

| | Example 11 | 12 | 13 | 14 | 15 | Comp. Ex. 7 | 8 | 9 |
|---|---|---|---|---|---|---|---|---|
| Contamination of Metering Roll | A | A | A | A | A | A | A | A |
| Ink Bleed Properties | A | A | A | A | A | A | A | A |
| Emulsifying Properties | A | A | A | A | A | A | A | A |
| Continuous Stability | A | A | A | A | A | A | A | A |
| Deterioration of Image Area | A | A | A | A | A | C | C | C |

Then the printing press was stopped, each dampening water (5, 10, 20 or 50 μl) was dropped on the solid and 30% half-tone dot portions of the PS plate using a syringe and allowed to stand for 60 minutes. Then the printing operation was again started to evaluate the degree of deterioration of the image area. The results thus obtained are listed in the following Table 9.

TABLE 9

| | Example 11 | 12 | 13 | 14 | 15 | Comp. Ex. 7 | 8 | 9 |
|---|---|---|---|---|---|---|---|---|
| 5 μl | A | A | A | A | A | C | C | C |
| 10 μl | A | A | A | A | A | C | C | C |
| 20 μl | A | A | A | A | A | C | C | C |
| 50 μl | A | A | A | A | A | C | C | C |

A: no problem
B: slightly deteriorated (ring-like mark)
C: deteriorated

The dampening water of Examples 11 to 15 did not cause deterioration of the image area of the lithographic printing plate and the latter was completely protected as compared with those observed in Comparative Examples 7 to 9.

EXAMPLES 16 TO 22

Dampening water compositions 16 to 22 (details thereof are shown in Table 10) were prepared in the same manner used in Examples 1 to 5. In Table 10, the numerical values are expressed in terms of grams. These compositions were diluted to 1000 ml with water. The test results obtained are summarized in Table 11.

TABLE 10

| Component | Example 16 | 17 | 18 | 19 | 20 | 21 | 22 |
|---|---|---|---|---|---|---|---|
| Water-Soluble Polymer: | | | | | | | |
| Hydroxypropyl cellulose (HPC) (available from Shin-Etsu Chemical Co., Ltd.) | 10 | — | — | 10 | 5 | 10 | 5 |
| Vinyl methyl ether/maleic anhydride copolymer (Gantreds S-95; available from GAP Corp.) | — | 10 | — | — | — | — | — |
| Hydroxymethylpropyl cellulose (Metrose 60SH50; available from Shin-Etsu Chemical Co., Ltd.) | — | — | 7 | — | 5 | — | 5 |
| pH Buffering Agent: | | | | | | | |
| phosphoric acid (85%) | 5 | 5 | 5 | 5 | 5 | 5 | 5 |
| ammonium secondary phosphate | 4 | 4 | 4 | 4 | 4 | 4 | 4 |
| ammonium secondary citrate | 10 | 10 | 10 | 10 | 10 | 10 | 10 |
| Nitrate: | | | | | | | |
| magnesium nitrate | 20 | 20 | 20 | 20 | 20 | 20 | 20 |
| potassium nitrate | 10 | 10 | 10 | 10 | 10 | 10 | 10 |
| Glycol Ether: | | | | | | | |
| ethylene glycol monobutyl ether | 300 | — | — | — | — | 350 | — |
| propylene glycol monopropyl ether | — | 300 | — | 200 | — | — | 200 |

TABLE 10-continued

| | | | | | | | |
|---|---|---|---|---|---|---|---|
| dipropylene glycol monomethyl ether | — | — | 300 | — | 200 | — | — |
| tetraphenylphosphonium bromide | 10 | 10 | 10 | 10 | 10 | 10 | 10 |
| p-toluenesulfonic acid | 20 | 20 | 20 | 20 | 20 | 20 | 20 |
| Compound | | | | | | | |
| A | 30 | — | — | — | 20 | — | — |
| B | — | 30 | — | — | — | — | — |
| C | — | — | 50 | — | — | — | — |
| D | — | — | — | — | 10 | — | — |
| E | — | — | — | 30 | — | — | — |
| Preservative: Biohope (trade name, available from KI Chemical Industries, Inc.) | 2 | 2 | 2 | 2 | 2 | 2 | 2 |
| Pure Water | (ad. 1000 ml) | | | | | | |

Compounds:

A

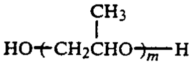 (m (average valve): 100)

B

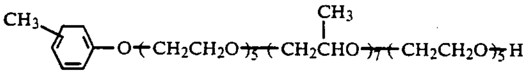

C

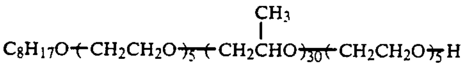

D

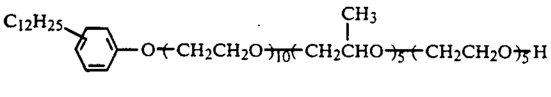

E

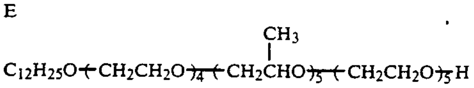

Test Methods: Various properties were determined in the same manner used in Examples 1 to 5. Further, foaming properties of the dampening water in the dampening water circulating system of the printing press were determined according to the following three-stage evaluation.

| | |
|---|---|
| No foaming: | A |
| Slightly foaming: | B |
| Foaming: | C |

The results obtained are listed in the following Table 11.

TABLE 11

| | Examples | | | | | | |
|---|---|---|---|---|---|---|---|
| | 16 | 17 | 18 | 19 | 20 | 21 | 22 |
| Contamination of Metering Roll | A | A | A | A | A | A | A |
| Ink Bleed Properties | A | A | A | A | A | A | A |
| Emulsifying Properties | A | A | A | A | A | A | A |
| Continuous Stability | A | A | A | A | A | A | A |
| Foaming Properties | A | A | A | A | A | C | C |

What is claimed is:

1. A concentrated dampening water composition for lithographic printing comprising, a) 0.1 to 10% by weight of a hydrophilic polymeric compound having a film-forming ability;

b) 0.01 to 15% by weight of a pH buffering agent;

c) 5 to 80% by a weight of a water-miscible organic solvent which is a combination of a compound represented by the following general formula (VII) and a compound represented by the following general formula (VIII):

$$R^{20}O-(-CH_2CH(R^{21})O-)_n-H \quad (VII)$$

wherein $R^{20}$ represents a hydrogen atom or a $C_{1-4}$ alkyl group; $R^{21}$ represents a hydrogen atom or a methyl group; and n is an integer ranging from 1 to 20;

$$R^{22}-C(R^{23})(OR^{24})-CH_2CH_2OH \quad (VIII)$$

wherein $R^{22}$ and $R^{23}$ each represents a hydrogen atom or a $C_{1-4}$ alkyl group and $R^{24}$ represents a $C_{1-4}$ alkyl group;

d) 0.05 to 10% by weight of at least one member selected from the group consisting of compounds represented by the following general formulas (I) to (VI); and e) 30 to 80% by weight of water:

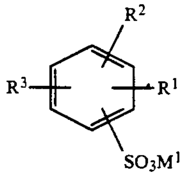
[I]

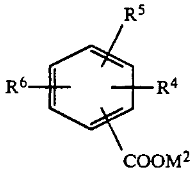
[II]

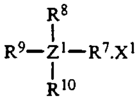
[III]

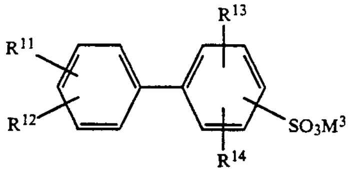
[IV]

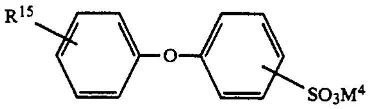
[V]

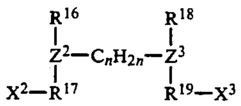
[VI]

wherein $R^1$, $R^2$ and $R^3$ may be the same or different and each represents a hydrogen or halogen atom or a $C_{1-3}$ alkyl, $C_{1-3}$ hydroxyalkyl or hydroxyl group; $R^4$, $R^5$ and $R^4$ may be the same or different and each represents a hydrogen or halogen atom or a $C_{1-3}$ alkyl, mercapto, sulfo, hydroxyl or carboxyl group; $R^7$ to $R^{10}$ and $R^{16}$ to $R^{19}$ each represents a $C_{1-12}$ alkyl, $C_{5-12}$ cyclic alkyl, $C_{1-12}$ hydroxyalkyl, benzyl or substituted or unsubstituted phenyl group; $Z^1$ to $Z^3$ each represents N, P or B; $X^1$ to $X^3$ each represents an anion or cation selected from the group consisting of halogen, nitrate, sulfate, phosphate, hydroxyl, $PF_6^-$, $Li^+$, $Na^+$, $K^+$and $NH_4^+$; n is an integer ranging from 1 to 5; $R^{11}$ and $R^{12}$ each represents a hydrogen atom or an alkyl group having 1 to 6 carbon atoms; $R^{13}$ represents a hydrogen atom or a hydroxyl group; $R^{14}$ represents a hydrogen atom or a sulfo group; $R^{15}$ represents a hydrogen atom or a $C_{1-6}$ alkyl or $C_{1-6}$ hydroxyalkyl group; and $M^1$, $M^2$, $M^3$ and $M^4$ each represents a hydrogen atom or an alkali metal or ammonium ion.

2. The dampening water composition of claim 1 wherein the amount of the compound of the formula (VIII) ranges from 1 to 20% by weight.

3. The dampening water composition of claim 1 wherein the component c) is a combination of a compound represented by the following general formula (VII), and compound represented by the following general formula (VIII) and a compound selected from the group consisting of 2-ethyl-1,3-hexanediol and adducts of 2-ethyl-1,3-hexanediol with at least one of ethylene oxide and propylene oxide.

4. The dampening water composition of claim 3 wherein the amount of [2-ethyl-1,3-hexanediol and/or ethylene oxide and/or propylene oxide adducts of 2-ethyl-1,3-hexanediol] the compound selected from the group consisting of 2-ethyl-1,3-hexanediol and adducts of 2-ethyl-1,3-hexanediol with at least one of ethylene oxide and propylene oxide ranges from 0.1 to 30% by weight.

5. The dampening water composition of claim 1 wherein the component d) is at least one member selected from the group consisting of the compounds of the general formula (III).

6. The dampening water composition of claim 1 wherein the component d) comprises a compound of the general formula (I).

7. The dampening water composition of claim 1 wherein it further comprises, as a component (f), at least one member selected from the group consisting of compounds represented by the following general formulas (IX) and (X):

$$HO—(—CH_2CH_2O—)_a—(—CH_2CH(CH_3)O—)_b—(—CH_2CH_2O—)_c—H \quad (IV)$$

$$R^{25}O—(—CH_2CH_2O—)_4—(—CH_2CH(CH_3)O—)_e—(—CH_2CH_2O—)_f—H \quad (X)$$

wherein $R^{25}$ represents an alkyl group having 8 to 16 carbon atoms or a phenyl group carrying an alkyl group having 1 to 12 carbon atoms; a and c each is an integer of 0 to 20; b is an integer of 30 to 500; d and f each is an integer of 0 to 10 and e is an integer of 4 to 35, provided that d+f is an integer of 1 to 10.

8. The dampening water composition of claim 7, wherein the amount of the component f) ranges from 0.01 to 10% by weight.

9. The dampening water composition of claim 1 wherein it further comprises at least one water-soluble nitrate in an amount ranging from 0.1 to 20% by weight.

10. The dampening water composition of claim 1 wherein it further comprises a surfactant in an amount ranging from 0.01 to 3.0% by weight.

11. The dampening water composition of claim 1 wherein it further comprises a wetting agent in an amount ranging from 0.1 to 25% by weight.

12. The dampening water composition of claim 1 wherein it further comprises a chelating agent in an amount ranging from 0.01 to 5% by weight.

13. The dampening water composition of claim 1 wherein it further comprises an antifoaming agent in an amount of 0.001 to 1% by weight.

14. The dampening water composition of claim 1 wherein it further comprises an anti-corrosion agent in an amount ranging from 0.0001 to 5% by weight.

15. The dampening water composition of claim 1 wherein it further comprises a preservative in an amount ranging from 0.01 to 4% by weight.

16. A dampening solution for lithographic printing, which comprises the dampening water composition of claim 1 and 10 to 100 volume times of water per a volume of said dampening water composition.

* * * * *